(12) United States Patent
Balachandran (10) Patent No.: US 9,405,659 B2
(45) Date of Patent: Aug. 2, 2016

(54) MEASURING THE LOGGING QUALITY OF A COMPUTER PROGRAM

(71) Applicant: VMWARE, INC., Palo Alto, CA (US)

(72) Inventor: Vipin Balachandran, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/458,272

(22) Filed: Aug. 13, 2014

(65) Prior Publication Data

US 2015/0378869 A1    Dec. 31, 2015

(30) Foreign Application Priority Data

Jun. 27, 2014  (IN) .......................... 3150/CHE/2014

(51) Int. Cl.
*G06F 9/44*       (2006.01)
*G06F 11/36*      (2006.01)

(52) U.S. Cl.
CPC ........ *G06F 11/3624* (2013.01); *G06F 11/3636* (2013.01)

(58) Field of Classification Search
None
See application file for complete search history.

(56) References Cited

U.S. PATENT DOCUMENTS

| | | | |
|---|---|---|---|
| 6,718,535 B1 | 4/2004 | Underwood | |
| 7,143,392 B2 | 11/2006 | Li et al. | |
| 8,245,203 B2 | 8/2012 | Becker | |
| 8,452,761 B2 | 5/2013 | Sabato et al. | |
| 8,473,922 B2 | 6/2013 | Li et al. | |
| 8,578,340 B1 | 11/2013 | Daudel et al. | |
| 2003/0212987 A1 | 11/2003 | Demuth et al. | |
| 2005/0015751 A1 | 1/2005 | Grassens | |
| 2005/0065973 A1 | 3/2005 | Steensgaard et al. | |
| 2006/0059146 A1 | 3/2006 | McAllister et al. | |
| 2009/0049428 A1 | 2/2009 | Cozmei | |
| 2009/0106594 A1 | 4/2009 | Zhang et al. | |
| 2011/0067008 A1 | 3/2011 | Srivastava et al. | |
| 2011/0083123 A1 | 4/2011 | Lou et al. | |
| 2011/0154300 A1 | 6/2011 | Rao et al. | |
| 2011/0246826 A1 | 10/2011 | Hsieh et al. | |
| 2011/0296244 A1 | 12/2011 | Fu et al. | |
| 2012/0137181 A1 | 5/2012 | Thompson | |
| 2013/0073336 A1* | 3/2013 | Heath .................... G06Q 30/02 705/7.29 |
| 2014/0149576 A1 | 5/2014 | Pavlov et al. | |

OTHER PUBLICATIONS

Weihang Jiang, et al., "Understanding Customer Problem Troubleshooting From Storage System Logs", in Proceedings of the 7th USENIX Conference on File and Storage Technoiogies, ser. FAST '09. Berkeley, CA, USA: USENIX Association, 2009, pp. 43-56.
"Apache Log4j", http://logging.apache.org/log4j/.

(Continued)

*Primary Examiner* — Qamrun Nahar (57) ABSTRACT

Techniques are described for measuring or quantifying the logging behavior in the source code of a computer program. In particular, the techniques select a method identified as exhibiting the ideal logging behavior in a computer program and then compute the overall logging quality score for the entire computer program based on the deviation in logging behaviors between the selected method and all other methods in the source code of the project. This overall logging quality score can be compared to various benchmarks of existing projects with high logging quality. If the software logging quality is found to be low, various steps can be taken by the developers to improve the logging before the software release.

20 Claims, 6 Drawing Sheets

(56) References Cited

OTHER PUBLICATIONS

Ding Yuan, et al., "Characterizing Logging Practices in Open-Source Software", in Proceedings of the 2012 International Conference on Software Engineering, ser. ICSE 2012. Piscataway, NJ, USA: IEEE Press, 2012, 11 pages.

Ding Yuan, et al., "Improving Software Diagnosability Via Log Enhancement", in Proceedings of the sixteenth international conference on Architectural support for programming languages and operating systems, ser. ASPLOS XVI. New York, NY, USA: ACM, 2011, 12 pages.

Pamela Bhattacharya et al., "Graph-Based Analysis and Prediction for Software Evolution", in Proceedings of the 2012 International Conference on Software Engineering. IEEE Press, 2012, 11 pages.

Magiel Bruntink et al., "Discovering Faults in Idiom-Based Exception Handling", in Proceedings of the 28th International Conference on Software Engineering, ser. ICSE '06. New York, NY, USA: ACM, 2006, 10 pages.

Thomas J. McCabe, "A Complexity Measure," IEEE Transactions on Software Engineering, vol. SE-2, No. 4, Dec. 1976, pp. 308-320.

Level (Apache Log4j 1.2.17 API), May 27, 2015, pp. 1-5.

The log4j.properties file, May 27, 2015, pp. 1-2.

* cited by examiner

```
LOG-RANK(G, commits)
1   for each commit c ∈ commits
2       for each node m ∈ G
3           C_v[m] = 0; C_a[m] = 0; C_d[m] = 0
4       for each log printing statement change l ∈ c
5           m = l.method
6           if m ∉ G or IS-MOVED(l) or IS-NEW(m, c)
7               continue
8           if IS-VERBOSITY-CHANGED(l)
9               C_v[m] = C_v[m] + 1
10          else if IS-LOG-ADDED(l)
11              C_a[m] = C_a[m] + 1
12          else if IS-LOG-DELETED(l)
13              C_d[m] = C_d[m] + 1
14      for each node m ∈ G
15          lr_c = (W_v × C_v[m] + W_a × C_a[m] + W_d × C_d[m]) / m.eloc
16          w_lr = 1 / (1+BUG-PRIORITY(c))
17          lr[m] = lr[m] + w_lr × lr_c
18  return lr
```

MEASURING THE LOGGING QUALITY OF A COMPUTER PROGRAM

RELATED APPLICATIONS

Benefit is claimed under 35 U.S.C. 119(a)-(d) to Foreign application Serial No. 3150/CHE/2014 filed in India entitled "MEASURING THE LOGGING QUALITY OF A COMPUTER PROGRAM", filed on Jun. 27, 2014, by VMware, Inc., which is herein incorporated in its entirety by reference for all purposes.

TECHNICAL FIELD

The present disclosure generally relates to software logging and tracing techniques and more particularly relates to quantifying the quality of the logging code in a computer program.

BACKGROUND

When developing software, programmers usually add log statements to the source code, which later provide information about the execution of the program. This information is recorded in one or more log files during the execution of the program and can be viewed and/or analyzed using a number of tools. Log files are valuable data sources for debugging. The troubleshooting time of production failures is reduced when log files are available. In cases where it is difficult to reproduce production failures, logs are sometimes the only available resources to aid problem diagnosis. This is especially true for critical bugs which require fast resolution, and the time spent for reproducing such bugs should be minimized.

Currently, there is no accepted industry-wide standard for logging, and it is often done in an arbitrary manner. There exist a number of libraries which aid logging, but such log libraries offer little help in standardizing the logging practice. For example, software projects built using Java as the main programming language often use log 4j as the logging library. Logging libraries frequently associate a verbosity level with each of the log printing statements. For example, log 4j has built-in verbosity levels such as TRACE, DEBUG, INFO, WARN, ERROR and FATAL; with the TRACE verbosity level being assigned the lowest rank, and FATAL being assigned the highest rank. The advantage of verbosity level is that the library can be configured to emit only a subset of log statements without recompiling the code or modifying the log printing statements. For example, if the root logger verbosity level in log 4j is set to INFO, only the log statements with verbosity level of INFO or above (i.e., ERROR and FATAL) are logged.

Due to the arbitrary nature of logging, new programmers in a project often find it difficult to understand the ideal logging behavior to be followed for the project. The logging behavior in this context refers to various aspects of logging including the density of log statements, verbosity level assignment, diagnostic context in the log messages, and the like. If not property understood, improper logging behavior may lead to lack of log statements, less contextual data, unnecessary log statements and improper verbosity levels. The lack of log statements and less contextual data could make the production failure diagnosis difficult.

Developers are often confused about what to log. The decision may be simple in the case of error conditions or exceptions. But with other parts of the code, even guidelines offer little help. This results in missing or unnecessary log statements. When confused, developers tend to add more log printing statements than necessary since it is considered to be safer than missing vital data. But unnecessary log statements will result in fast roll-over of log files, thereby losing valuable diagnostic data. It also creates visual clutter, and can confuse the developer during debugging.

One problem with improper verbosity level assignment is that if the rank of a log statement's verbosity level is higher than it should be, it would create noise in the logs and result in fast rollover. If the rank is lesser than it should be, it won't be logged if the configured verbosity level for logging has a higher rank.

Given the difficulties in understanding the ideal logging behavior, it would be highly beneficial to assess the quality of software logging before release. If the software logging quality were found to be low, then steps could be taken to improve the logging before software release. There exist a variety of metrics which assess different aspects of software. For example, cyclomatic complexity is a software metric that measures the complexity of a program, and is computed based on the number of execution paths in the source code. The premise is that it is better to have methods with low cyclomatic complexity so that resultant code can be tested and maintained more easily. However, there exist no standard adopted metrics for measuring the logging behavior as well as the logging quality of a software project.

DETAILED DESCRIPTION

Systems and methods in accordance with various embodiments of the present disclosure provide more efficient ways to measure or quantify the logging behavior in the source code of a computer program as well as quantifying the logging quality. In particular, embodiments described herein select a method exhibiting the ideal logging behavior in a software project and then compute the overall logging quality score for the entire software project based on the deviation in logging behaviors between the selected method and all other methods in the source code of the project. This overall logging quality score can be compared to various benchmarks of existing projects with high logging quality. If the software logging quality is found to be low, various steps can be taken by the developers to improve the logging before the software release.

In various embodiments, the process for measuring the logging quality can begin by computing a logging behavior value for each method in the source code of a software program. The logging behavior value is meant to quantify the logging behavior of the method and can be based on metrics, such as the number of non-error log statements per executable lines of code, the number of ERROR or FATAL level log statements per error condition, and/or the verbosity level ratio of DEBUG/TRACE level log statements to INFO/WARN level log statements.

Once all of the logging behavior values have been computed, they can be compared against a method that has been identified as exhibiting the ideal logging behavior for the software development project. In particular, for each method other than the ideal method, the system can determine the root mean square deviation (RMSD) between the logging behavior value of that method and the logging behavior value of the ideal method. Based on all of the aggregate RMSD values for all methods, the system can compute an overall log quality score for the software program. This overall log quality score can be used to measure the logging quality of the software project.

In order to identify the method which exhibits the ideal logging behavior for the project, the system can compute a numerical weight for each method in the source code that can be used to rank the logging behavior of that method (i.e., compute the LogRank of each method). The numerical weight is computed in such a way that the methods whose log printing statements have been modified more frequently will generally receive higher numerical weight. The assumption is that since most logging enhancements are done as after thoughts during code reviews or while fixing bugs, the ideal logging behavior will be exhibited by those methods whose logging behavior was modified the most frequently. The numerical weight can also be based on the bug priority data associated with the modifications, which can be retrieved from the bug tracker of the source code. For example, if a modification to the log printing statements was made when fixing a high priority hug, it can be assumed that the modification more accurately reflects the ideal logging behavior for the project and thus, the numerical weight for the modified method can be increased. Once all of the methods have been ranked according to the numerical weight, the highest ranking method can be used to provide insight to developers about the ideal logging behavior for the project.

Figure 1:
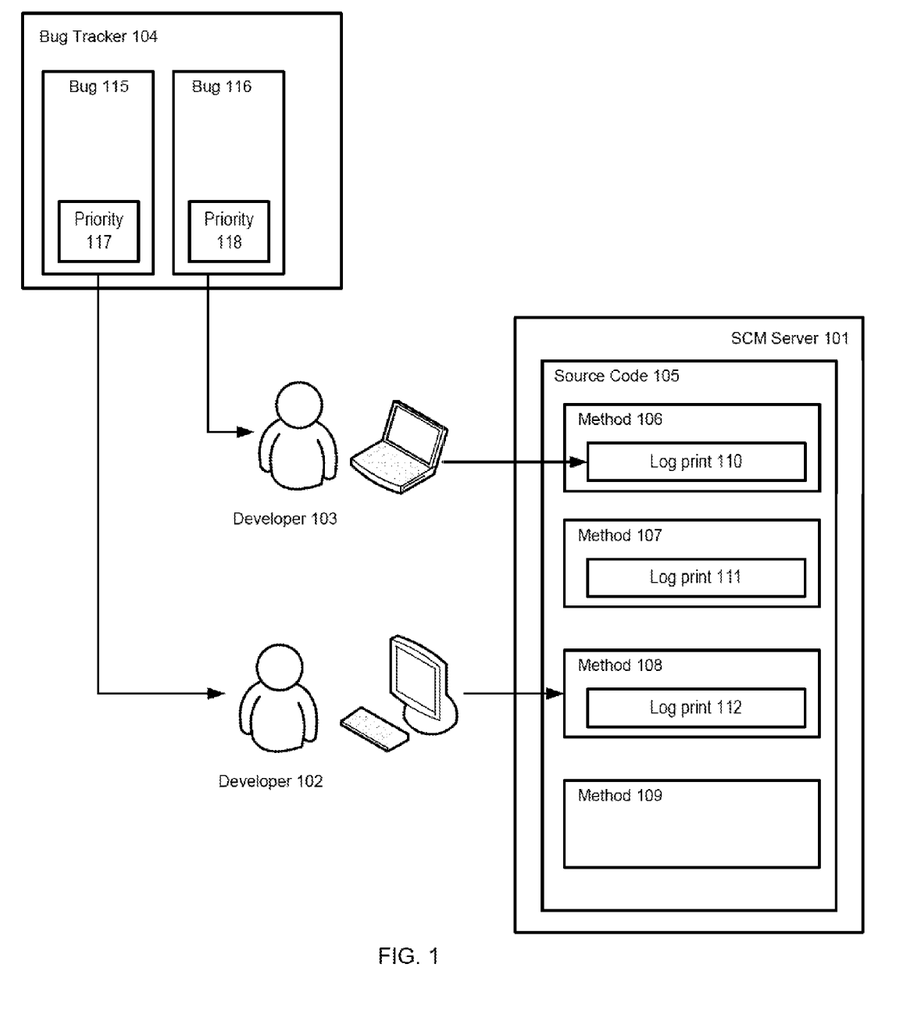
FIG. 1 illustrates an example of a source code development environment, in accordance with various embodiments.

FIG. 1 illustrates an example of a source code development environment, in accordance with various embodiments. As illustrated in this example, the Software Configuration Management (SCM) server 101 contains the source code of the software project being developed and numerous developers (102, 103) can be simultaneously working on the source code 105. The source code 105 contains large numbers of methods (106, 107, 108, 109), many of which end up containing log printing statements (110, 111, 112). The log printing statements typically write information (e.g., runtime execution information) to one or more log files. These log files can be analyzed in order to debug the application, identify issues, enhance performance and the like.

As previously mentioned, most logging enhancements are done as afterthoughts, either during code reviews or during the process of fixing bugs (115, 116). The average churn rate of logging code is almost twice when compared to the entire code. While fixing bugs, developers (102, 103) analyze log files in detail, identify various logging issues and add/update/delete log printing statements (e.g., 110, 111, 112). For example, as shown in this illustration, developer 103 may be tasked with fixing bug 116 and during the process of fixing the bug 116, developer 103 modifies the log printing statement 110 of method 106. Similarly, developer 102 may be tasked with fixing bug 115 and in the process of fixing the bug, developer 102 may modify method 108 without modifying its log printing statement.

When developers modify the log printing statements, this enhanced logging code often provides insights into best logging practice that should be followed for the entire project. Intuitively, if a method's log printing statements have been modified many times, its logging behavior could be considered highly refined, and can serve as a good example of ideal logging behavior that should be followed for the project. Based on this postulation, this application proposes a log ranking metric (LogRank) to identify methods exhibiting ideal logging behavior. A high value of LogRank implies an ideal logging behavior.

LogRank assigns a numerical weight to each of the methods in the source code in such a way that the methods whose logging behavior has been frequently modified as afterthoughts will get a higher numerical weight. Developers can then look into methods of high LogRank to identify the ideal logging behavior. LogRank can be computed by analyzing the commit and bug history of the source code 105. Once a number of changes to the source code have been committed, the log printing statement changes in each of the commits are analyzed and scores are assigned to associated methods.

In most cases, the project utilizes a bug tracker 104 system. The bug tracker 104 maintains a list of all bugs that have been identified or reported. Each bug typically is associated with a priority (117, 118) that indicates the severity of the bug. For example, a bug that significantly affects the most important functionality of the code will typically be given a high priority, while a latent bug that only slightly affects system functionality may be assigned a lower priority.

It has been observed that while fixing a high priority bug, extra care is usually exercised by the developer in the code change. Therefore, log enhancements made during a commit that involves fixing a high priority bug can be considered highly refined when compared to the log changes in other commits. Therefore, priority of the bug fixed by the commit, if any, can also be factored in while assigning the log rank score. It should be noted that the terms "log rank" and "LogRank" are sometimes used interchangeably throughout this application and it is intended that the term "log rank" corresponds to the metric "LogRank" illustrated in the figures.

Figure 2:
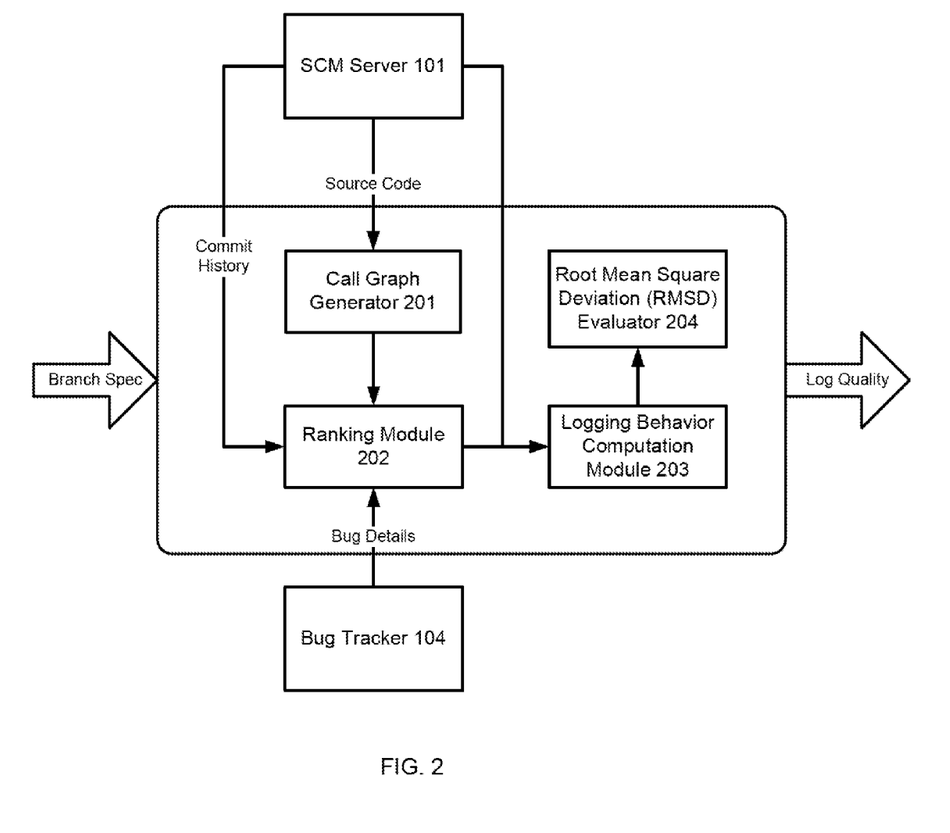
FIG. 2 illustrates an example of a system for measuring the overall logging quality of a software development project, in accordance with various embodiments.

FIG. 2 illustrates an example of a system for measuring the overall logging quality of a software development project, in accordance with various embodiments. This overview illustrates the use of a call graph to represent the methods of the source code. However, it should be noted that not all embodiments described herein are limited to the use of a call graph and in many alternative embodiments, a different data structure (e.g., tree, linked list, etc.) or a text file may be utilized.

In this example, the input to logging quality measurement is the branch spec, which contains branch name and connection parameters of the Software Configuration Management (SCM) server 101 from where the project source code can be downloaded. The call graph generator module 201 generates static call graph of the source code, which serves as one of the inputs to the ranking module 202. The ranking module 202 assigns numerical weights to various nodes (methods) in the call graph based on historical logging enhancements (fetched from SCM server 101) and bug priority data (fetched from bug tracker 104).

In the illustrated embodiment, a static call graph is a directed graph where nodes represent methods/unction s and edges represent function calls. In this implementation, if a method A calls another method B, then there will be a directed edge from the node representing method A to the node representing method B. The call graph generator 201 analyzes the source code, and generates its static call graph for further analysis.

To compute the LogRank of each method, the ranking module 202 considers the changes in log printing statements in the commit history. The changes that are considered include verbosity level changes and addition or deletion of log printing statements. In one embodiment, changes in static content of log messages, addition or deletion of contextual data, renaming of variables constituting the contextual data, renaming of log printing function names and verbosity levels etc. are ignored. This is because such changes might have been made to keep the logging behavior consistent with changes in logic. In the same way, moving log printing statements from one place to another within the same method can be ignored, and not considered as deletion and addition of a log printing statement. Log printing statements in a newly introduced method may also be ignored, since there are no afterthoughts involved there. It should be noted, however, that ignoring certain changes mentioned above should in no way be considered as required to the embodiments described herein. Further details on the process of computing the LogRank of each method will be described below, with reference to FIG. 3.

Once the LogRank of each method has been computed, this score can be used to identify the method exhibiting the ideal logging behavior for the software project by ranking all of the methods. Stated differently, the method having the highest LogRank score will be the method assumed to exhibit the ideal logging behavior for the project.

Once the highest ranking method has been identified, the logging behavior computation module 203 computes a logging behavior value (Log B) for each method in the source code. The Log B measure quantifies the logging behavior of a method and is defined based on the following metrics computed at a method level:

The number of non-error log statements (verbosity level below ERROR) per executable lines of code ($n_l$). This metric measures the density of log printing statements in a method.

The number of error or fatal level log statements per error condition ($n_e$). In the case of the Java programming language, the error conditions include catch clauses and throw statements.

The verbosity level ratio ($r_v$). This metric measures the ratio of TRACE/DEBUG level log statements to INFO/WARN level log statements. The DEBUG level is typically enabled only during testing, and is normally turned off in production. In ideal settings, there should be more DEBUG level statements than INFO level statements in a method.

In one embodiment, Log B of a method ($m_i$) is defined as a weighted sum of the above metrics and can be computed (based on $m_i$'s source code) according to the formula shown in the table below:

TABLE 1

$$LogB(m_i) = \alpha \times n_{li} + \beta \times n_{ei} + \gamma \times r_{vi}$$

In this example, the variables $\alpha$, $\beta$, and $\gamma$ represent weights that can be made user-configurable and which are used to determine the relative importance of the metrics described above in determining the logging behavior. Namely, $n_{li}$ represents the number of non-error log statements per executable lines of code in the method $m_i$, $n_{ei}$ represents the number of error or fatal level log statements per error condition in the method $m_i$; and $r_{vi}$ represents the verbosity level ratio of method $m_i$.

In the illustrated embodiment of FIG. 2, the logging behavior computation module 203 computes the Log B values of each of the methods in the source code, which is provided as input to the Root Mean Square Deviation (RMSD) evaluator 204. The RMSD evaluator 204 then computes the overall log quality score (Log Q) of the given project as the Root Mean Square Deviation of all the Log B values from the Log B value of the top LogRank method (i.e., the method having ideal logging behavior). In one embodiment, the Log Q value can be computed according to the formulas shown in the table below:

TABLE 2

$$LogQ = \sqrt{\frac{\sum_{i=1}^{n}(L\hat{o}gB - LogB(m_i))^2}{n}}$$

where:
$L\hat{o}gB = LogB(\arg\max_{m_i} LogRank(m_i))$

In this example, the variable n represents the total number of methods in the source of the software project and the formula $\arg\max_{m_i} LogRank(m_i)$ represent the method having the highest LogRank. The algorithm for computing LogRank is described in further detail below, with reference to FIG. 3.

Figure 3:
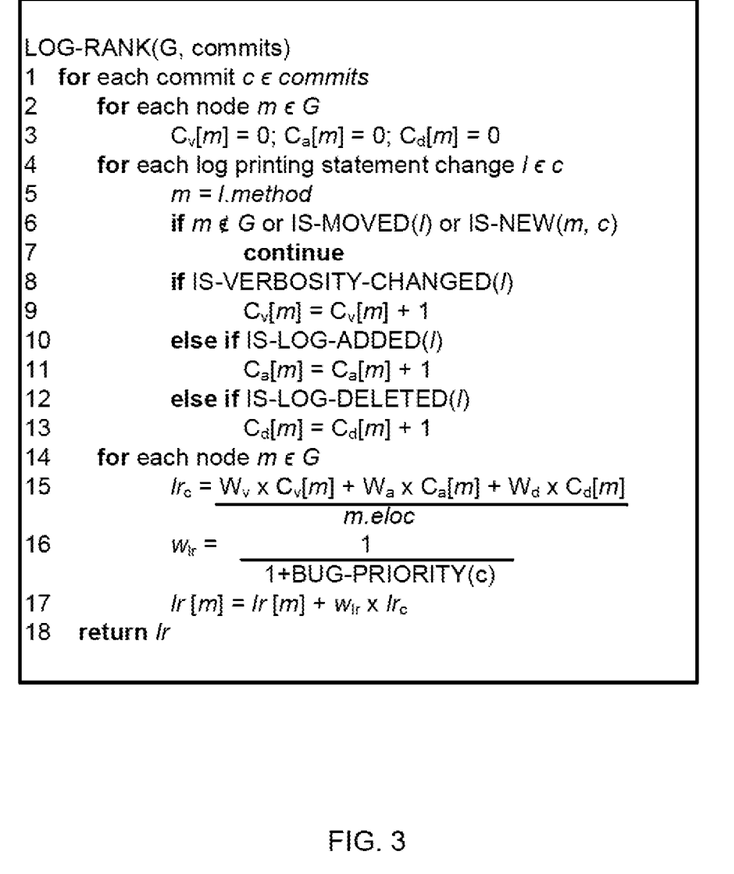
FIG. 3 illustrates an example of an algorithm for identifying methods which exhibit ideal logging behavior, in accordance with various embodiments.

FIG. 3 illustrates an example of an algorithm for identifying methods which exhibit ideal logging behavior, in accordance with various embodiments. As shown in this illustration, the for loop in line 1 iterates over each of the commits and updates the LogRank of each of the methods in the call graph G. The counts of verbosity level changes ($C_v$), log statement additions ($C_a$), and deletions ($C_d$) in each of the methods in G, corresponding to the current commit c are initialized in line 3. The for loop in line 4 iterates over each of the log printing statement changes in the commit and updates the count. If the method in corresponding to the log printing statement change l cannot be found in G (e.g., method might have been deleted, moved or renamed), further processing is skipped (line 6). The change l is also skipped if it is found that it is due to the movement of a log statement within the same method (checked using IS-MOVED in line 6) or in is a new method introduced in commit c (checked using IS-NEW). The various counts are incremented using the "if" and "else if" statements in line 8, depending on the type of change. The count $C_v[m]$ is incremented if the log printing statement change l in method in corresponds to a verbosity level change (checked using IS-VERBOSITY-CHANGED in line 8). Similarly the counts $C_a[m]$ or $C_d[m]$ are incremented based on checks IS-LOG-ADDED (line 10) and IS-LOG-DELETED (line 12), which returns TRUE if the change l corresponds to log addition or log deletion respectively.

The for loop in line 14 updates the LogRank values of each of the methods based on log printing statement changes in commit c. To update the LogRank, the normalized weighted sum of counts of different types of log changes in the method (caused by the commit) is computed first (line 15). The weights ($W_v$, $W_a$ and $W_d$) are configurable and determine the importance of a particular type of log printing statement change in defining the ideal logging behavior. The normalization is done using the count of executable lines of code in the method. If the commit is made to address a high priority bug, it can be assumed that the logging behavior has been thoroughly analyzed. Therefore, such commits should add more weight to the LogRank. The weight caused by the bug associated with the commit is computed in line 16. Here we assume that the bug priorities are in the range [0 . . . 4], with 0 representing the highest priority and 4, the lowest priority. If the commit does not correspond to a bug fix, the priority is taken as 5. After processing all the commits, LogRank values are returned in line 18.

Figure 4:
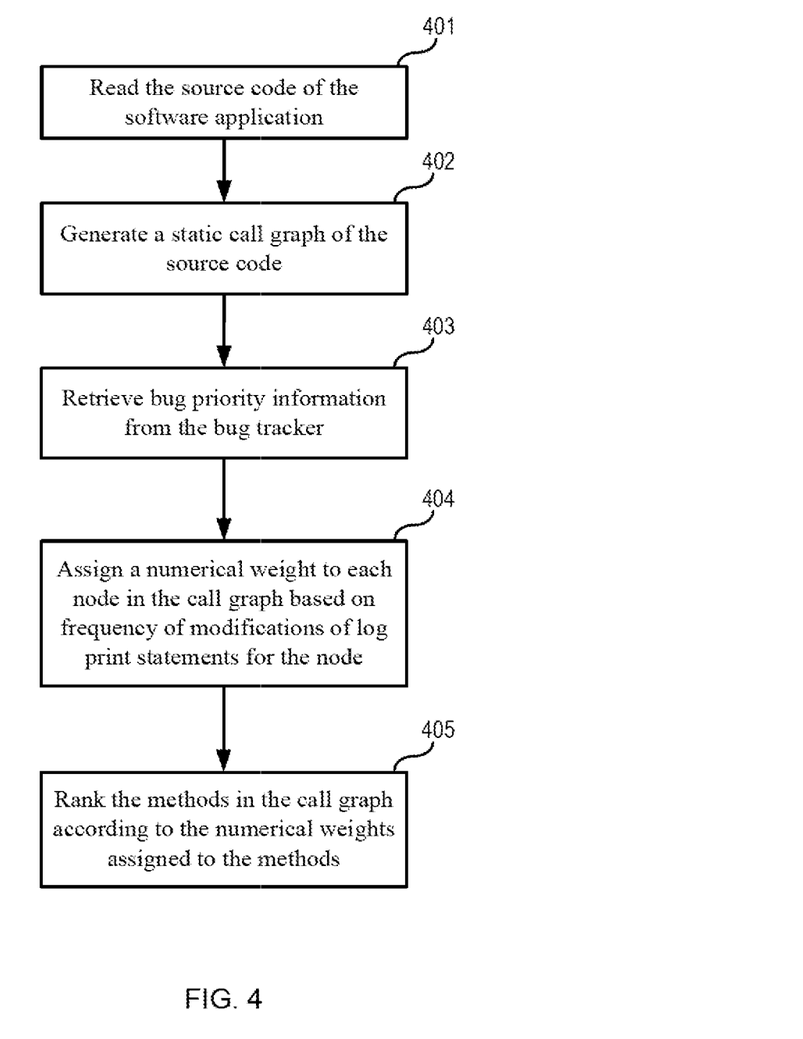
FIG. 4 illustrates an example of a process flow for identifying the method which exhibits ideal logging behavior, in accordance with various embodiments.

FIG. 4 illustrates an example of a process flow for identifying the method that exhibits ideal logging behavior, in accordance with various embodiments. As shown in operation 401, the call graph generator reads the source code of the software application, which can be Obtained from an SCM server. In operation 402, a static call graph is generated for the source code. The static call graph represents each method in the source code as a node in the graph and each function call between the methods are represented by the edges between the nodes.

In operation 403, the ranking module obtains bug priority information from the bug tracker. The ranking module also obtains the commit history of the code changes from the SCM server. In operation 404, the ranking module assigns a numerical weight to each node in the call graph. The numerical weight is used to determine a log rank of said each method. The numerical weight can be computed based at least in part on a frequency of modifications performed on the one or more log printing statements, as well as the priority information of the bug that triggered the code change commit. For example, methods whose log printing statements have been modified more frequently receive higher numerical weights and conversely, methods whose log printing statements have been modified less frequently or have not been modified, receive lower numerical weights. The numerical weight is also based on the bug priority data associated with the modifications. For example, if a modification to the log printing statements was made when fixing a high priority bug, it can be assumed that the modification more accurately reflects the ideal logging behavior for the project and thus, the numerical weight for the modified method can be increased.

In operation 405, the ranking module ranks all the methods in the call graph according to the numerical weights assigned to the methods. The highest ranking methods can then be displayed to the developers, as indicating the ideal logging behavior. Programmers can inspect methods of high LogRank value to identify the method exhibiting ideal logging behavior to be followed for the project. For example, in many embodiments, it can be assumed that the method having the highest LogRank value is the method with the most ideal logging behavior.

Figure 5:
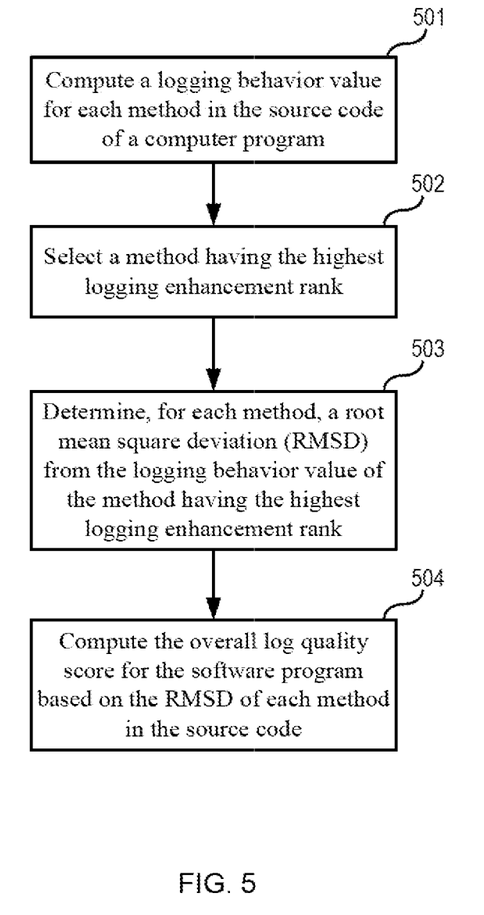
FIG. 5 illustrates an example of a process flow for measuring the quality of the logging behavior for the entire software development project, in accordance with various embodiments.

FIG. 5 illustrates an example of a process flow for measuring the quality of the logging behavior for the entire software development project, in accordance with various embodiments. In operation 501, the system computes a logging behavior value for each method in the source code of a software program. The logging behavior value is used to quantify the logging behavior of the method and can be based on metrics including but not limited to (a) the number of non-error log statements per executable lines of code in the method; (b) the number of error or fatal level log statements per error condition; and/or (3) the verbosity level ratio, which measures the ratio of DEBUG/TRACE level log statements to INFO/WARN level log statements, as previously described.

In operation 502, the system selects the method that is identified as exhibiting an ideal logging behavior. In one embodiment, the selected method is the method having the highest LogRank value, as previously described. In other embodiments, the method may be identified based on user input, such as in the case where an expert selects a particular method that the expert deems as exhibiting the ideal logging behavior.

In operation 503, the system determines for each method (other than the selected method) a root mean square deviation (RMSD) between the logging behavior value (Log B) of that method and the logging behavior value of the selected method. Based on the RMSD of all methods in the source code, the system can compute an overall log quality score (Log Q) for the software program.

In this manner, the various embodiments described herein enable the system to quantify the logging behavior (represented by Log B) of methods and compute its value for the top LogRank method. This quantity represents the ideal logging behavior of the project. The overall log quality score (Log Q) is then defined as the Root Mean Square Deviation (RMSD) of Log B values of all the methods from that of the top LogRank method. If majority of methods exhibit ideal logging behavior, then their Log B values lie closer to each other, and hence a low RMSD (Log Q) value. Therefore, a low value of Log Q is preferred, and it can be compared against some benchmark Log Q values computed using existing projects with high logging quality.

Figure 6:
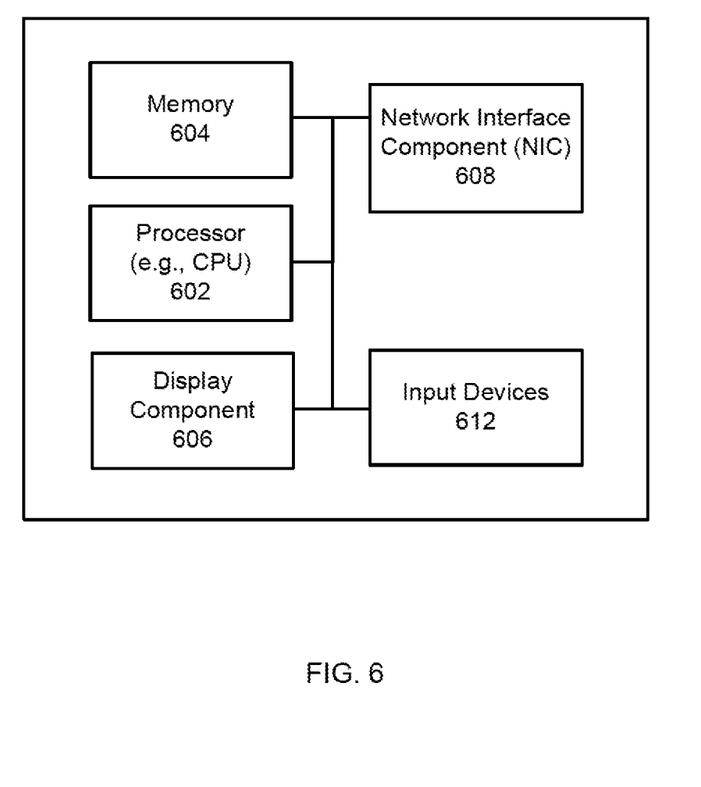
FIG. 6 illustrates an example of some general components of a computing device, in accordance with various embodiments.

FIG. 6 illustrates an example of some general components of a computing device, in accordance with various embodiments. In this particular example, the device includes one or shore processors (e.g., central processing units (CPUs) 602 for executing instructions that can be stored in physical memory component 604. The memory component 604 can include many types of memory, data storage, or non-transitory computer-readable storage media, such as random access memory (RAM) storing program instructions for execution by the processor 602 a separate form of storage for images or data, a removable memory for sharing information with other devices and the like. The computing device typically can further comprise a display component 606, such as a monitor, a touch screen, liquid crystal display (LCD), or the like. In various embodiments, the computing device will include at least one input device 612 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 608 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for quantifying a quality of software logging, said method comprising:
    under control of one or more computer systems configured with executable instructions,
        determining a logging behavior value for each method of a plurality of methods in source code of a software program, the logging behavior value quantifying a logging behavior of said each method;
        selecting a first method from the plurality of methods that is identified as exhibiting an ideal logging behavior;
        determining, for each method other than the first method, a root mean square deviation (RMSD) between the logging behavior value of said each method and the logging behavior value of the first method; and
        computing an overall log quality score for the software program based at least in part on the RMSD of said each method in the plurality of methods.

2. The method of claim 1, wherein determining the logging behavior value further comprises:
    computing the logging behavior value of a method based on one or more of:
        a number of non-error log statements per executable lines of code in the method;
        a number of error or fatal level log statements per error condition; or
        a verbosity level ratio of debug/trace level log statements to info/warn level log statements.

3. The method of claim 2, wherein the logging behavior value is computed according to:

$$\text{Log } B(m_i) = \alpha \times n_{li} + \beta \times n_{ei} + \gamma \times r_{vi}$$

wherein:
    $n_{li}$ represents the number of non-error log statements per executable lines of code in the method;
    $n_{ei}$ represents the number of error or fatal level log statements per error condition in the method;
    $r_{vi}$ represents the verbosity level ratio of the method;
    $\alpha$, $\beta$, and $\gamma$ each represent a user-configurable weight;
    $m_i$ represents the method for which the logging behavior is being evaluated; and
    Log $B(m_i)$ represents the logging behavior value of the method.

4. The method of claim 1, wherein the overall log quality score for the software program is computed according to:

$$\text{Log} Q = \sqrt{\frac{\sum_{i=1}^{n}(\text{L}\hat{\text{o}}\text{g}B - \text{Log}B(m_i))^2}{n}}$$

wherein:

$$\text{L}\hat{\text{o}}\text{g}B = \text{Log } B(\arg\max_{m_i} \text{LogRank}(m_i))$$

wherein:

n represents the total number of methods in the software program;

arg max$_{m_i}$ LogRank($m_i$) represents the selected first method identified as exhibiting the ideal logging behavior; and Log Q represents the overall log quality score for the software program.

5. The method of claim 1, wherein selecting the first method further comprises:
computing a log rank value of said each method in the plurality of methods based on historical log modification data associated with the method and based on bug priority data; and
ranking the plurality of methods according to the log rank value of said each method, wherein the first method contains the highest log rank value.

6. The method of claim 1, further comprising:
comparing the overall log quality score for the software program against a benchmark to determine whether the overall log quality score is satisfactory.

7. The method of claim 1, further comprising:
storing the plurality of methods in a static call graph, wherein each node of the static call graph represents an individual method of the plurality of methods and wherein each edge in the static call graph represents a function call between methods.

8. A computing system, comprising:
at least one processor; and
memory including instructions that, when executed by the at least one processor, cause the computing system to:
determine a logging behavior value for each method of a plurality of methods in source code of a software program, the logging behavior value quantifying a logging behavior of said each method;
select a first method from the plurality of methods that is identified as exhibiting an ideal logging behavior;
determine, for each method other than the first method, a root mean square deviation (RMSD) between the logging behavior value of said each method and the logging behavior value of the first method; and
compute an overall log quality score for the software program based at least in part on the RMSD of said each method in the plurality of methods.

9. The computing system of claim 8, wherein determining the logging behavior value further comprises:
computing the logging behavior value of a method based on one or more of:
a number of non-error log statements per executable lines of code in the method;
a number of error or fatal level log statements per error condition; or
a verbosity level ratio of debug/trace level log statements to info/warn level log statements.

10. The computing system of claim 9, wherein the logging behavior value is computed according to:

Log $B(m_i) = \alpha \times n_{li} + \beta \times n_{ei} + \gamma \times r_{vi}$ wherein:
$n_{li}$ represents the number of non-error log statements per executable lines of code in the method;
$n_{ei}$ represents the number of error or fatal level log statements per error condition in the method;
$r_{vi}$ represents the verbosity level ratio of the method;
$\alpha$, $\beta$, and $\gamma$ each represent a user-configurable weight;
$m_i$ represents the method for which the logging behavior is being evaluated; and Log $B(m_i)$ represents the logging behavior value of the method.

11. The computing system of claim 8, wherein the overall log quality score for the software program is computed according to:

$$LogQ = \sqrt{\frac{\sum_{i=1}^{n}(L\hat{o}gB - LogB(m_i))^2}{n}}$$

wherein:

$L\hat{o}gB = \text{Log } B(\arg\max_{m_i}\text{LogRank}(m_i))$ wherein:
n represents the total number of methods in the software program;
arg max$_{m_i}$ LogRank($m_i$) represents the selected first method identified as exhibiting the ideal logging behavior; and
Log Q represents the overall log quality score for the software program.

12. The computing system of claim 8, wherein selecting the first method further comprises:
computing a log rank value of said each method in the plurality of methods based on historical log modification data associated with the method and based on bug priority data; and
ranking the plurality of methods according to the log rank value of said each method, wherein the first method contains the highest log rank value.

13. The computing system of claim 8, wherein the memory further comprises instructions that, when executed by the at least one processor, cause the computing system to:
compare the overall log quality score for the software program against a benchmark to determine whether the overall log quality score is satisfactory.

14. The computing system of claim 8, wherein the memory further comprises instructions that, when executed by the at least one processor, cause the computing system to:
store the plurality of methods in a static call graph, wherein each node of the static call graph represents an individual method of the plurality of methods and wherein each edge in the static call graph represents a function call between methods.

15. A non-transitory computer readable storage medium containing one or more sequences of instructions, the instructions when executed by one or more processors causing the one or more processors to execute a set of operations comprising:
determining a logging behavior value for each method of a plurality of methods in source code of a software program, the logging behavior value quantifying a logging behavior of said each method;
selecting a first method from the plurality of methods that is identified as exhibiting an ideal logging behavior;
determining, for each method other than the first method, a root mean square deviation (RMSD) between the logging behavior value of said each method and the logging behavior value of the first method; and
computing an overall log quality score for the software program based at least in part on the RMSD of said each method in the plurality of methods.

16. The non-transitory computer readable storage medium of claim 15, wherein determining the logging behavior value further comprises:

computing the logging behavior value of a method based on one or more of:
  a number of non-error log statements per executable lines of code in the method;
  a number of error or fatal level log statements per error condition; or
  a verbosity level ratio of debug/trace level log statements to info/warn level log statements.

17. The non-transitory computer readable storage medium of claim 16, wherein the logging behavior value is computed according to:

$$\text{Log } B(m_i) = \alpha \times n_{li} + \beta \times n_{ei} + \gamma \times r_{vi}$$

wherein:
$n_{li}$ represents the number of non-error log statements per executable lines of code in the method;
$n_{ei}$ represents the number of error or fatal level log statements per error condition in the method;
$r_{vi}$ represents the verbosity level ratio of the method;
$\alpha$, $\beta$, and $\gamma$ each represent a user-configurable weight;
$m_i$ represents the method for which the logging behavior is being evaluated; and
Log $B(m_i)$ represents the logging behavior value of the method.

18. The non-transitory computer readable storage medium of claim 15, wherein the overall log quality score for the software program is computed according to:

$$\text{Log} Q = \sqrt{\frac{\sum_{i=1}^{n}(\text{L}\hat{o}gB - \text{Log}B(m_i))^2}{n}}$$

wherein:

$$\text{L}\hat{o}gB = \text{Log } B(\arg\max_{m_i} \text{LogRank}(m_i))$$

wherein:
n represents the total number of methods in the software program;
$\arg\max_{m_i} \text{LogRank}(m_i)$ represents the selected first method identified as exhibiting the ideal logging behavior; and
Log Q represents the overall log quality score for the software program.

19. The non-transitory computer readable storage medium of claim 15, wherein selecting the first method further comprises:
  computing a log rank value of said each method in the plurality of methods based on historical log modification data associated with the method and based on bug priority data; and
  ranking the plurality of methods according to the log rank value of said each method, wherein the first method contains the highest log rank value.

20. The non-transitory computer readable storage medium of claim 15, further comprising instructions when executed by one or more processors, cause the one or more processors to execute the operation of:
  comparing the overall log quality score for the software program against a benchmark to determine whether the overall log quality score is satisfactory.

* * * * *